(12) United States Patent
Jin et al.

(10) Patent No.: US 11,113,293 B2
(45) Date of Patent: Sep. 7, 2021

(54) LATENT NETWORK SUMMARIZATION

(71) Applicant: ADOBE INC., San Jose, CA (US)

(72) Inventors: Di Jin, Ann Arbor, MI (US); Ryan A. Rossi, Mountain View, CA (US); Eunyee Koh, San Jose, CA (US); Sungchul Kim, San Jose, CA (US); Anup Rao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 365 days.

(21) Appl. No.: 16/252,169

(22) Filed: Jan. 18, 2019

(65) Prior Publication Data
US 2020/0233864 A1 Jul. 23, 2020

(51) Int. Cl.
*G06F 16/24* (2019.01)
*G06F 16/2458* (2019.01)
(Continued)

(52) U.S. Cl.
CPC ........ *G06F 16/2465* (2019.01); *G06F 16/215* (2019.01); *G06F 16/26* (2019.01);
(Continued)

(58) Field of Classification Search
CPC .... G06F 16/2465; G06F 16/26; G06F 16/215; G06F 16/288; G06F 16/9024; G06F 2216/03
(Continued)

(56) References Cited

U.S. PATENT DOCUMENTS

2018/0336457 A1* 11/2018 Pal .................. G06N 3/0454
2019/0044959 A1* 2/2019 Chen .................. G06N 3/088
(Continued)

OTHER PUBLICATIONS

Jin et al. "Bridging Network Embedding and Graph Summarization", Nov. 11, 2018. (Year: 2018).*
(Continued)

*Primary Examiner* — Hosain T Alam
*Assistant Examiner* — Robert F May
(74) *Attorney, Agent, or Firm* — Shook, Hardy & Bacon L.L.P.

(57) ABSTRACT

Embodiments of the present invention provide systems, methods, and computer storage media for latent summarization of a graph. Structural features can be captured from feature vectors associated with each node of the graph by applying base functions on the feature vectors and iteratively applying relational operators to successive feature matrices to derive deeper inductive relational functions that capture higher-order structural information in different subgraphs of increasing size (node separations). Heterogeneity can be summarized by performing capturing features in appropriate subgraphs (e.g., node-centric neighborhoods associated with each node type, edge direction, and/or edge type). Binning and/or dimensionality reduction can be applied to the resulting feature matrices. The resulting set of relational functions and multi-level feature matrices can form a latent summary that can be used to perform a variety of graph-based tasks, including node classification, node clustering, link prediction, entity resolution, anomaly and event detection, and inductive learning tasks.

20 Claims, 10 Drawing Sheets

(51) Int. Cl.
*G06F 16/901* (2019.01)
*G06F 16/26* (2019.01)
*G06F 16/215* (2019.01)
*G06F 16/28* (2019.01)

(52) U.S. Cl.
CPC ........ *G06F 16/288* (2019.01); *G06F 16/9024* (2019.01); *G06F 2216/03* (2013.01)

(58) Field of Classification Search
USPC .......................................................... 707/696
See application file for complete search history.

(56) References Cited

U.S. PATENT DOCUMENTS

2019/0073586 A1* 3/2019 Chen ...................... G06N 7/005
2019/0130212 A1* 5/2019 Cheng .................. G06K 9/4628
2019/0370695 A1* 12/2019 Chandwani ............ G06N 20/00
2020/0035002 A1* 1/2020 Epasto .................... G06T 9/001
2020/0104426 A1* 4/2020 Wu ......................... G06F 17/16

OTHER PUBLICATIONS

Hamilton et al., "Inductive Representation Learning on Large Graphs", Sep. 10, 2018. (Year: 2018).*
Jin et al., "Exploratory Analysis of Graph Data by Leveraging Domain Knowledge", 2017 IEEE International Conference on Data Mining. (Year: 2017).*
Shah, N. et al. "On Summarizing Large-Scale Dynamic Graphs." IEEE Data Eng. Bull. 40 (2017): 75-88. (Year: 2017).*
Jin, D., Rossi, R., Koutra, D., Koh, E., Kim, S., & Rao, A. (2018). Bridging Network Embedding and Graph Summarization. arXiv preprint arXiv:1811.04461. 11 pages.

* cited by examiner

LATENT NETWORK SUMMARIZATION

BACKGROUND

In the context of graph theory and network science, graphs and networks are made of nodes that are connected by edges. For example, a directed graph has edges with a designated directionality from one node to another, while edges in an undirected graph connect nodes without directionality. Graphs and networks can be used to model many real-world applications in fields such as computer science, linguistics, physics and chemistry, social sciences, biology, and mathematics, to name a few. For example, a web site can be modeled as a directed graph with different nodes representing different web pages, and the web page nodes can be connected by directed edges that represent hyperlinks between the web pages. Algorithms can be applied to such models to perform graph-based tasks such as node classification, node clustering, link prediction, and entity resolution. For example, a social network can be modeled as a graph with user nodes and web page nodes. User "likes" can be modeled as edges between nodes for users and liked web pages, and link prediction can be used to recommend other web pages that may interest a particular user.

Real-world graphs commonly involve billions of nodes. As a result, storing these graphs and their conventional representations often requires substantial storage space, and operating on them requires substantial time and resources.

SUMMARY

Embodiments of the present invention are directed to latent summarization of a graph (or network). Generally, nodes of an input graph can be represented by, or otherwise associated with, a set of feature vectors. Latent summarization learns relational functions that summarize the behavior of a graph into a compressed representation that captures structural information of the graph. The structural information can be captured from the graph (e.g., the feature vectors) at different levels. At a first level, a base feature matrix can be constructed with values generated by applying a base function to each feature vector for each node. Any type of base function can be designated and may comprise one or more relational operators (e.g., mean, variance, sum, max, min, l1-distance, and/or l2-distance) applied to a designated neighborhood for a given node (e.g., an egonet).

At subsequent levels, higher-order structural information can be captured by iteratively applying the relational operators to successive feature matrices. For example, the relational operator(s) applied to generate the base feature matrix can be re-applied to vectors (e.g., columns) of the base feature matrix to generate a first-level feature matrix. The relational operator(s) can again be applied to the first-level feature matrix to generate a second-level feature matrix, and so on. By iteratively applying relational operators to successive levels of feature matrices, relational functions that comprise multiple sequential relational operators can be composed to effectively capture higher-order structural information of different node-centric subgraphs with increasing sizes (node separations). The multiple levels of feature matrices form a multi-level structural representation of the input graph.

Graph heterogeneity (e.g., node types, edge direction, edge types, labels and attributes, etc.) can be summarized by capturing features from various node-centric subgraphs (e.g., node-centric neighborhoods associated with each node type, edge direction, and/or edge type). The resulting localized structural information can be included in the multi-level structural representation (e.g., by adding a new dimension to form a tensor, by concatenating the localized structural information into an existing dimension, etc.). As a result, some embodiments can support any arbitrary input graph. Additionally or alternatively, binning can be applied (e.g., logarithmic binning) to describe each feature vector in the multi-level representation (e.g., each column) by the distribution of its feature values. Dimensionality reduction can be applied (e.g., singular value decomposition, non-negative matrix factorization, etc.) to generate a compressed representation.

The relational functions and the resulting set of multi-level feature matrices can be used as a latent summary. The feature matrices capture the significant structural features of the input graph in node-centric subgraphs with different sizes (node separations). The latent summary is latent in the sense that it captures graph structure in a latent space and can be used to derive node embeddings on-the-fly without having to store them. A latent summary can support any of a variety of graph-based tasks, including node classification, node clustering, link prediction, entity resolution, anomaly and event detection, and others. For example, in some embodiments, the latent summary learned on one graph can be transferred to another graph for inductive learning tasks, such as anomaly and event detection.

As a result, using techniques described herein, a complex input graph can be decomposed into a concise structural representation that reduces storage demands while maintaining sufficient information to support any of a number of graph-based tasks.

BRIEF DESCRIPTION OF THE DRAWINGS

The present invention is described in detail below with reference to the attached drawing figures, wherein.

DETAILED DESCRIPTION

Overview

Figure 1:
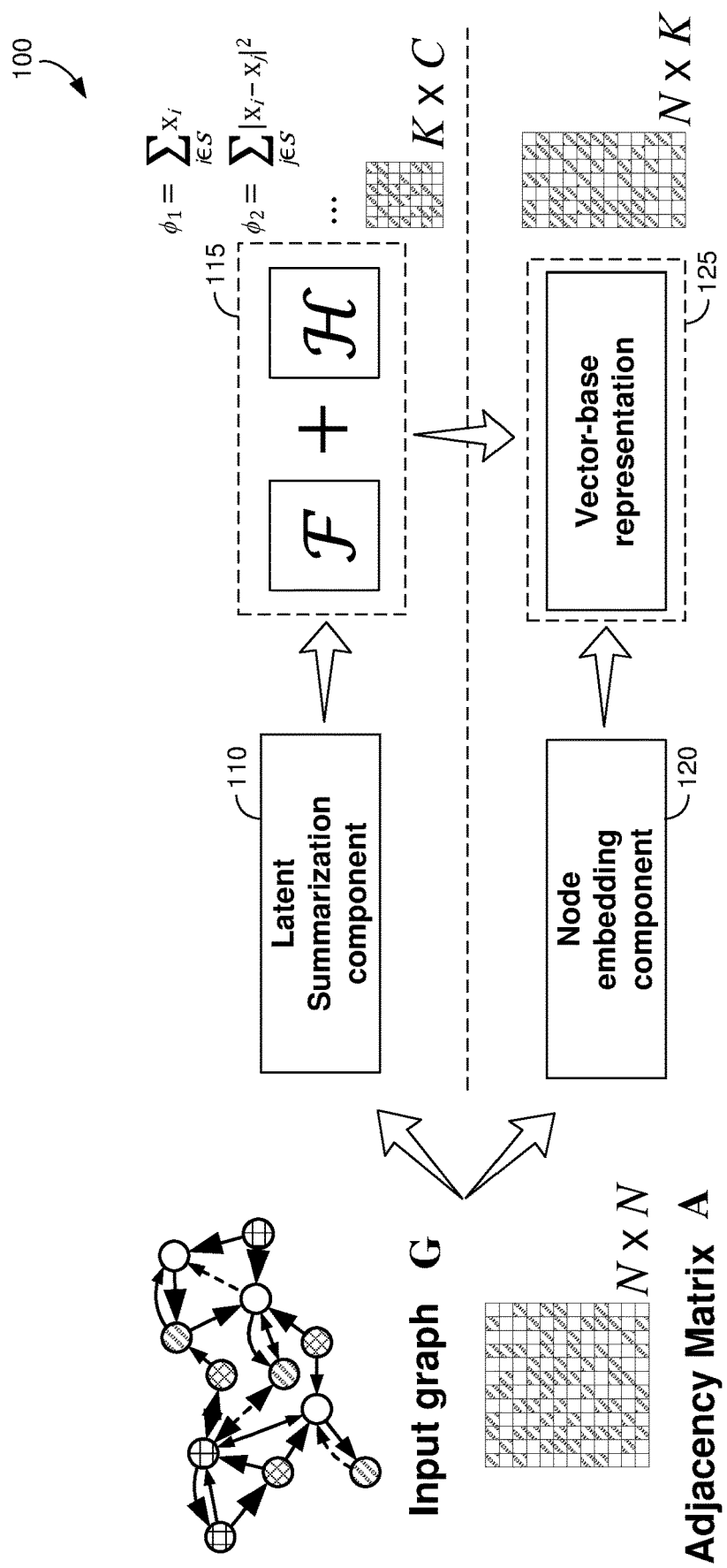
FIG. 1 is a block diagram illustrating a comparison between a conventional node embedding technique and latent summarization, in accordance with embodiments of the present invention.

Various conventional techniques aim to represent complex graphs in ways that facilitate performing graph-based tasks on the underlying data. Generally, such techniques can be evaluated based on properties including (P1) ability to handle arbitrary heterogeneous graphs, (P2) space-efficiency, (P3) ability to support inductive learning, and (P4) on-the-fly access to node embeddings (e.g., ability to derive on-the-fly) to facilitate answering queries related to specific nodes in the graph.

For example, one conventional technique for representing complex graphs is node embedding (also known as representation learning), which seeks to identify a vector representation for each node in a graph such that similar nodes are grouped together in vector space. Node similarity can be defined in terms of proximity (based on a corresponding adjacency matrix or positive pointwise mutual information matrix) using random walks (RW) or deep neural networks (DNN). Other node embedding approaches seek to capture similar node behavioral patterns (roles) or structural similarity (e.g., based on node degree, triangle counts, or other graph invariants). Some node embedding techniques can handle heterogeneous graphs (e.g., by performing RW on predefined metapaths) or inductive learning (e.g., by defining attributed RW atop relational operators). Node embedding is prevalent thanks to its success in a variety of downstream tasks. However, for real-world graphs with billions of nodes, handling dense node embeddings comes with computational and storage drawbacks, as they generally require space that is orders of magnitude larger than the original graph.

For example, recent advances in node embedding techniques have led to a variety of connectivity- and feature-based embedding techniques tailored for specific downstream tasks, such as link prediction, node classification, and alignment. However, the resulting dense K-dimensional node embeddings (with real values) pose significant computational and storage problems (P2), especially for massive graphs. By following the conventional setting of K=128 for dimensionality, a graph of one billion nodes requires roughly 1 TB for its node embeddings. Moreover, this dense representation often requires significantly more space than the original, sparse adjacency matrix of a graph. For example, learned node embeddings using conventional techniques can require 3 to 48 times more space than the original edge files for a graph. As such, conventional node embedding techniques have significant shortcomings.

Another conventional technique for representing complex graphs is graph summarization. Most graph summarization techniques fall into one of three categories: (1) aggregation-based, which group nodes or edges into super-nodes/edges based on application-oriented criteria or existing clustering algorithms; (2) abstraction-based, which remove less informative nodes or edges; and (3) compression-based, which aim to minimize the number of bits required to store the input graph. Summarization methods have a variety of goals, including query efficiency, pattern understanding, storage reduction, interactive visualization, and domain-specific feature selection. Most summarization works handling heterogeneous networks target specific graph mining tasks such as visualization, and are therefore limited to the specific targeted task. For example, one technique targets entity resolution by aggregating nodes into supernodes based on their labels and structural similarity. However, tailoring a technique to a specific targeted task significantly limits the technique's utility, as the derived summarization cannot be used for other graph-based tasks. Furthermore, while graph summarization techniques often address space-efficiency (P2), they do not support the ability to derive node embeddings on-the-fly (P4). The main challenge is that the information loss incurred during graph summarization is too great to permit derivation of an individual node behavioral representation. As a result, graph summarization techniques are unable to answer many queries related to specific nodes in a graph.

Accordingly, embodiments of the present invention are directed to a latent summarization system that learns a latent summary of an input graph (e.g., a network). A latent summary is a compact, latent representation of the structure of the graph with dimensionality that is independent of the size of the input graph (i.e., number of nodes and edges). The latent summarization system applies a set of relational operators and relational functions (compositions of operators) to the graph to capture the structure of egonets and higher-order subgraphs, respectively, and stores the captured structural features in low-rank feature matrices. Binning can be applied to represent each feature vector by the distribution of its values. Various types of heterogeneity summarization techniques can be applied to account for different node types, edge directionality, and/or edge types. A dimensionality reduction technique such as singular value decomposition can be applied to compress the feature matrices. The resulting feature matrices and the relational functions used to generate them can be used as the latent summary of the input graph.

Generally, the latent summarization system may support the generation of latent summaries for various types of input graphs, including homogeneous and heterogeneous graphs with or without directionality, weights, attributes or labels. In some embodiments, the latent summarization system can operate on any arbitrary heterogeneous graph, a general class of graphs that model complex structural and semantic information for both entities (nodes) and relationships (edges). As such, the latent summarization system can derive a low-dimensional representation of any arbitrary graph (e.g., network, relational data) in a latent space (P1) such that the representation is independent of graph size (i.e., the number of nodes and edges). In some embodiments, the latent summarization system can operate on a homogenous graph, which can be considered a special case of a generalized heterogeneous graph.

The latent summary system can use a latent summary (or provide a latent summary for use) in performing any number of graph-based tasks, including node classification, node clustering, link prediction, entity resolution, anomaly and event detection, and others. That is, rather than being tailored to a specific machine-learning task, latent summaries can be used to perform any number of graph-based tasks. Among other tasks, the representation can support on-the-fly computation of specific node embeddings, which capture the structural properties of the nodes (P4). For example, in some embodiments, the latent summarization system applies a multi-level inductive approach to generate a latent summary of a graph based on designated graph function compositions. Taking a set of arbitrary graph functions (e.g., degree), the latent summarization system iteratively applies relational operators over neighborhoods of the graph to derive higher-order function compositions that capture graph features at multiple levels (node separations). Low-rank approximation can be used to derive a latent summary at each of a plurality of levels, capturing sufficient structural information to support derivation of node embeddings.

Latent summarization and node embedding are complementary learning tasks with fundamentally different goals and outputs. FIG. 1 illustrates a comparison of the two techniques. For any given input graph G with N nodes, conventional node embedding (e.g., node embedding component 120 in FIG. 1) derives N node embedding vectors of K dimensions each that capture the structural properties of the nodes. Thus, the output of node embedding 120 is a N×K matrix 125 that is dependent on the size of the input graph (number of nodes N). This is in contrast to latent summarization (e.g., latent summarization component 110), which learns a size-independent representation (e.g., latent summary 115) of the input graph. As explained in more detail below, latent summary 115 does not depend on the number of nodes N or edges E of input graph G. Latent summarization also differs from traditional summarization approaches, which typically derive super-graphs that omit information that would be necessary to derive node embeddings on-the-fly. Instead, latent summarization component 110 learns a size-independent latent representation that supports deriving node embeddings 115 on-the-fly (P4). Furthermore, unlike node embedding methods that generate dense embeddings of fixed dimensionality, the latent summarization system can provide general, compact and multi-level latent summaries for any type of graph (P1), and the latent summaries can be used to generate node embeddings in an inductive manner without specifying extra heterogeneous characteristics (e.g., meta-paths indicating node types) (P3).

As such, using implementations described herein, a user can efficiently and effectively represent complex graphs and perform graph-based tasks, such as node classification, node clustering, link prediction, entity resolution, anomaly and event detection, and others. As explained in more detail below, the latent summarization system can support arbitrary heterogeneous graphs (e.g., heterogeneous networks) (P1), inductive learning by leveraging relational function compositions (P3), and on-the-fly embedding computation for all or a subset of nodes (P4). Furthermore, the latent summarization system is scalable with linear time complexity based on the number of nodes and edges, and space-efficient (P2) with size independent of the size of the input graph (i.e., the number of nodes and edges). As such, unlike prior techniques, the latent summarization system achieves all four properties (P1-P4). Moreover, the latent summarization system is easily parallelizable as the computations for each node are independent of one another. As a result, and as explained in more detail below, the latent summarization system described herein results in improvements in space efficiency and accuracy of graph-based task performance.

Having briefly described an overview of aspects of the present invention, various terms used throughout this description are provided. Although more details regarding various terms are provided throughout this description, general descriptions of some terms are included below to provider a clearer understanding of the ideas disclosed herein:

Graphs and networks—In the context of graph theory and network science, graphs and networks are made of nodes that are connected by edges. Nodes and/or edges can have attributes (e.g., categorical, real-valued, etc.). Although some embodiments are described with respect to graphs or networks, the techniques described herein can apply equally to graphs and networks. For example, some embodiments are described as being generalized for certain types of graphs or networks, but variations may be implemented for any type of graph (e.g., homogenous or heterogeneous, with or without directionality, with or without weights, with or without attributes, with or without labels, etc.).

Latent Network Summarization—Latent network summarization, latent graph summarization, and latent summarization refer to a process that learns a compressed representation (a latent summary) that captures representative structural information of a network (graph) and depends only on the complexity of the network (graph), rather than its size. Given an arbitrary graph G=(V, E) with V as the node set and E as the edge set (|V|=N, |E|=M), latent summarization can learn a function G→$\mathbb{R}$ K×C that maps the graph G to a K×C matrix that captures representative structural information of G such that K,C≪N and K,C≪M. Hence, the size of the output matrix is independent of graph size (i.e., number of nodes N and number of edges M). The output representation (a latent summary) can be used directly in data mining tasks (e.g., anomaly detection), and/or can be used to derive all or a subset of node-specific embeddings on-the-fly for learning tasks such as link prediction or classification. A latent summary is latent in the sense that it captures graph structure in a latent space and can be used to derive node embeddings on-the-fly without having to store them.

Heterogeneous Network—A heterogeneous network refers to a network with multiple types of nodes and/or edges. To generalize for any arbitrary graph (P1), a heterogeneous network can be represented as G=(V, E, θ, ξ) with node-set V, edge-set E, a node type mapping function θ: V→$T_V$, and an edge type mapping function defined as ξ: E→$T_E$. In the mapping functions, $T_V$ and $T_E$ denote the set of node object types and edge types, respectively.

Typed 1-neighborhood $\Gamma_t$ (egonet)—Within networks (e.g., heterogeneous networks), the typed 1-neighborhood (also called an egonet) is a subset of nodes within a 1-hop distance of a particular node. More specifically, given an arbitrary node i in graph G(V, E, θ, ξ), the typed t 1-neighborhood $\Gamma_t$(i) is the set of nodes with type t that are reachable by following edges (e.g., directed edges) e ∈ E originating from i with 1-hop distance. Generally, the typed 1-neighborhood $\Gamma_t^+$ of a node captures local structural information of the node. The 1-neighborhood of node i, Γ(i), is a superset of the typed neighborhood $\Gamma_t$(i), and includes nodes in the 1-neighborhood of i regardless of their types. Where edges are directed, the in-neighborhood $\Gamma_t^-$ and out-neighborhood $\Gamma_t^+$ define the sets of nodes with type t that point to, and away from, node i, respectively. Higher-order neighborhoods can be similarly defined. As such, the 1-neighborhood, $\Gamma_i$(i) denotes the set of nodes reachable following edges (e.g., directed edges) e ∈ E originating from i within 1-hop distance.

Relational operators and relational functions—Generally, the goal of latent network summarization is to derive a (size-independent) representation that captures the structure of a network and its underlying nodes. Capturing structure depends on the semantics of the network (e.g., weighted, directed), and different techniques can be employed for different input networks types. To be able to generalize to arbitrary graphs (e.g., networks) (P1), relational operators and functions may be applied to capture (e.g., aggregate) structural information of a graph into feature matrices. A relational operator φ(x,S), as used herein, is a basic function (e.g., sum) that operates on a feature vector x (e.g., an N×1 feature vector) associated with a set of applicable graph elements S (e.g., nodes in a 1-neighborhood Γ) and returns a single value. A relational operator applied over a graph or a subgraph (e.g., a 1-hop neighborhood) generalizes for inductive/across-network transfer learning tasks (P3). A relational function $f \in F$, as used herein, is a composition of relational operators $f=(\phi_1 \circ \ldots \circ \phi_{h-1} \circ \phi_h)$ (x,S) applied to feature values in x associated with the applicable set of nodes S. $f$ is considered to be order-h if and only if the feature vector x is applied to h relational operators. Thus, multiple relational operators iteratively applied over the same (x,S) constitute a relational function, and a single relational operator can be seen as a special case of relational function.

Example Latent Summarization Environment

Figure 2:
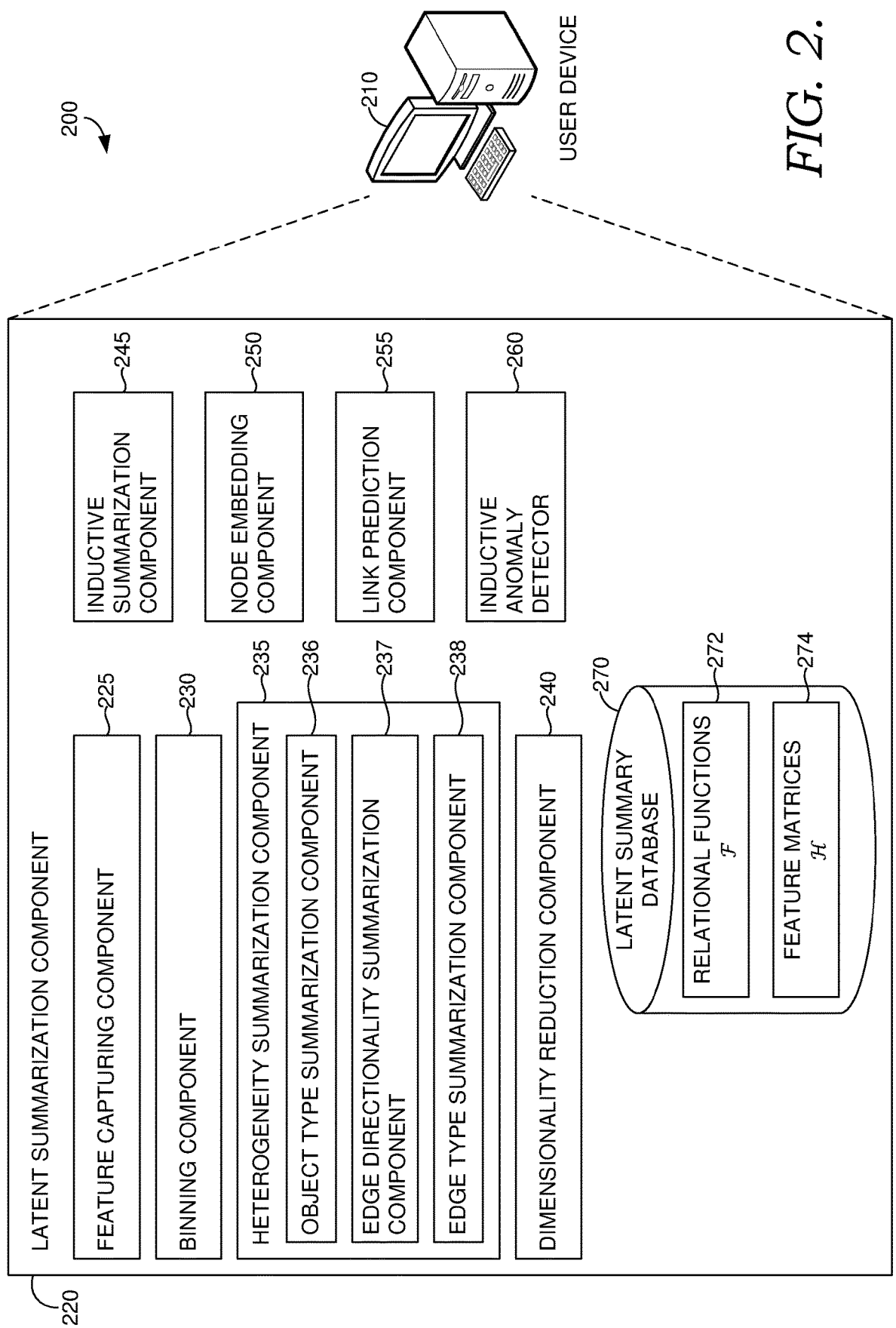
FIG. 2 is a block diagram illustrating an example latent summarization system, in accordance with embodiments of the present invention.

Referring now to FIG. 2, a block diagram of example latent summarization system 200 suitable for use in implementing embodiments of the invention is shown. Generally, latent summarization system 200 is suitable for latent summarization of graphs (e.g., networks), and, among other things, facilitates capturing representative structural information of a graph. Latent summarization system 200 includes a user device 210 having a latent summarization component 220. User device 210 can be any kind of computing device capable of facilitating latent summarization of graphs. For example, in an embodiment, user device 210 can be a computing device such as computing device 1000, as described below with reference to FIG. 10. In embodiments, user device 210 can be a personal computer (PC), a laptop computer, a workstation, a mobile computing device, a PDA, a cell phone, or the like. Additionally or alternatively, any or all of the components of latent summarization system 200 can be implemented on a separate computing device (e.g., a server) accessible by a network, which may include, without limitation, one or more local area networks (LANs) and/or wide area networks (WANs). Such networking environments are commonplace in offices, enterprise-wide computer networks, intranets, and the Internet.

As illustrated in FIG. 2, user device 210 includes latent summarization component 220. Latent summarization component 220 may be incorporated, or integrated, into an application(s) or an add-on or plug-in to an application(s). The application may generally be any application capable of facilitating latent summarization of graphs. As can be appreciated, in some embodiments, in addition to facilitating latent summarization of graphs, the application(s) may also facilitate performing graph-based tasks using a latent summary. The application(s) may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application(s) can be integrated into the operating system (e.g., as a service). Additionally or alternatively, latent summarization component 220, or some portion thereof, can be integrated into the operating system (e.g., as a service) or a server (e.g., a remote server). As such, the configuration illustrated in FIG. 2 should be understood simply as an example implementation.

Generally, latent summarization component 220 generates a latent summary of a graph, which can be stored in latent summary database 270. The latent summary can be used to perform various graph-based tasks, such as node classification, node clustering, link prediction, entity resolution, anomaly and event detection, and others. In the embodiment illustrated in FIG. 2, latent summarization component 220 includes feature capturing component 225, binning component 230, heterogeneity summarization component 235, dimensionality reduction component 240, inductive summarization component 245, node embedding component 250, link prediction component 255, inductive anomaly detector 260, and latent summary database 270.

Generally, a graph can be represented by any number of feature vectors b (e.g., rows and/or columns of its adjacency matrix). Feature capturing component 225 is configured to access an input graph and capture structural information from the graph (e.g., from feature vectors b representing the graph). In some embodiments, the representative feature vectors b can be received with an input graph, and both can be accessed. In some embodiments, the representative feature vectors b can be computed. Generally, feature capturing component 225 applies one or more designated base functions $f_b$ to the feature vectors b to generate a base feature matrix. The base feature matrix captures different structural properties of the nodes of the graph (e.g., within the 1-neighborhood Γ). Feature capturing component 225 can further iteratively apply one or more designated relational operators (relational functions) to the base feature matrix (e.g., to the columns of the base feature matrix) to generate successive levels of feature matrices that capture high-order structural information at different distances (node separations) in the graph. In some embodiments, binning component 230 can represent the distribution of values in the feature matrices (e.g., by applying logarithmic binning) to describe each feature vector (e.g., each N×1 feature vector) of the feature matrices by the distribution of its feature values, resulting in distribution-based feature matrices.

In some embodiments, heterogeneity summarization component 235 can apply heterogeneity summarization to the feature matrices (e.g., the distribution-based feature matrices) to account for different types of heterogeneous graphs. In the embodiment illustrated in FIG. 2 heterogeneity summarization component 235 includes object type summarization component 236, edge directionality summarization component 237, and edge type summarization component 238.

Object type summarization component 236 can enumerate object types in a given subgraph of interest, capture structural information for the different object types, and include this information in a new dimension of the feature matrices. This process can be seen as introducing one more dimension, the object types, to the feature matrices to form a tensor, and the tensor can be flattened (e.g., using horizontal concatenation). Similarly, edge directionality summarization component 237 can capture structural information from two disjoint subsets Γ+ and Γ− with incoming and outgoing edges, respectively, and include this information in a new dimension and/or concatenation of the feature matrices (e.g., the resulting tensor can be flattened using horizontal concatenation). Edge type summarization component 238 can capture structural information from subgraphs restricted to a specific edge type, derive a corresponding feature matrix per edge type (e.g., that incorporates both node types and edge directionality), and include this information in a new dimension and/or concatenate them (e.g., horizontally).

The result of the foregoing can be a set of multi-level, distribution-based feature matrices that account for heterogeneity. In some embodiments, dimensionality reduction component 240 can apply a dimensionality reduction technique (e.g., singular value decomposition (SVD), non-negative matrix factorization, etc.) to generate a compressed representation of the feature matrices. The resulting feature matrices 174 can be stored in latent summary database 170. In some embodiments, the relational functions 172 used to derive feature matrices 174 can additionally or alternatively be stored in latent summary database 170. Feature matrices 174 can capture the significant features of a graph in subgraphs at different distances (node separations) in a latent space. Collectively, a set of feature matrices generated for a graph and the relational functions used to generate them can be considered the latent summary of the graph.

Any number of graph-based tasks can be performed using a latent summary, or a portion thereof. For example, inductive summarization component 245 can automatically compose new relational functions to capture structural features that are transferable. Thus, the feature matrices learned on one graph can be transferred to another graph for inductive learning tasks. In another example, node embedding component 250 can derive node embeddings from a latent summary on-the-fly. In this manner, the node embeddings need not be stored, but rather, can be generated as needed, thereby saving storage space. Link prediction component 255 can use a latent summary to predict missing links (edges) between nodes (e.g., for ad targeting, recommendations, etc.), or to predict existing links that are incorrect. Inductive anomaly detector 260 can use a latent summary to identify significant events or anomalies in graph data. These are just a few examples of the different ways latent summaries can be used to perform graph-based tasks. Generally, a latent summary can be used to perform any machine-learning task that leverages node embeddings (which can be derived from latent summaries). These and other examples are contemplated within the present disclosure.

At a high level, the latent summarization system described herein can perform a class of methods using defined relational operators to handle arbitrary types of graphs (e.g., networks). More specifically, the latent summarization system can capture features by evaluating structural information and node proximity in node-centric subgraphs at different distances (node separations), and can summarize resultant structural feature matrices by applying dimensionality reduction (e.g., singular value decomposition (SVD), non-negative matrix factorization, etc.). Table 1 provides a list of symbols and notations used the following discussion, along with their corresponding definitions.

TABLE 1

Summary of symbols and notations

| Symbol | Definition |
| --- | --- |
| G(V, E), A | (un)directed and (un)weighted heterogeneous graph with node-set V and edge-set E ($|V| = N$, $|E| = M$) and its adjacency matrix |
| $\mathscr{F} = \{f_i\}$, F | ordered set of relational functions and its size |
| $f_b \in \mathscr{F}\%_b$ | the set of base graph functions (special relational functions) |
| l, L | index for level & total number of levels (i.e., max order of a relational function) |
| $\mathscr{B} = \{b_i\}$, B | set of initial feature vectors (e.g., vectors of length N) and its size |
| $\Phi = \{\phi_i\}$, R | set of relational operators and its size |
| S | applicable set of nodes of interest |
| $T_V$, $|T_V|$ | set of node types in the heterogeneous graph and its size |
| $T_E$, $|T_E|$ | set of edge types in the heterogeneous graph and its size |
| $\Gamma_t(i)$, $\Gamma(i)$ | typed t/type-independent 1-neighborhood of node i, respectively |
| $\Gamma_t^+(i)$, $\Gamma_t^-(i)$ | out-/in-typed t neighborhood of node v |
| $q^{(l)}$ | number of columns of matrix Y at level l |
| $X^{(O)}$ | N × $p^{(O)}$ base feature matrix derived by $\mathscr{F}_b$ |
| $X^{(l)}$ | N × $p^{(l)}$ generated feature matrix for level l |
| x, y | N-dimensional feature vector (column of X and Y, respectively) |

TABLE 1-continued

Summary of symbols and notations

| Symbol | Definition |
| --- | --- |
| $K_i$, K | embedding dimension at level-i and the final output embedding dimension, respectively |
| $Y^{(l)}$ | N × $q^{(l)}$ matrix induced by applying $\Psi$ on feature matrix $X^{(l)}$ |

Figure 3:
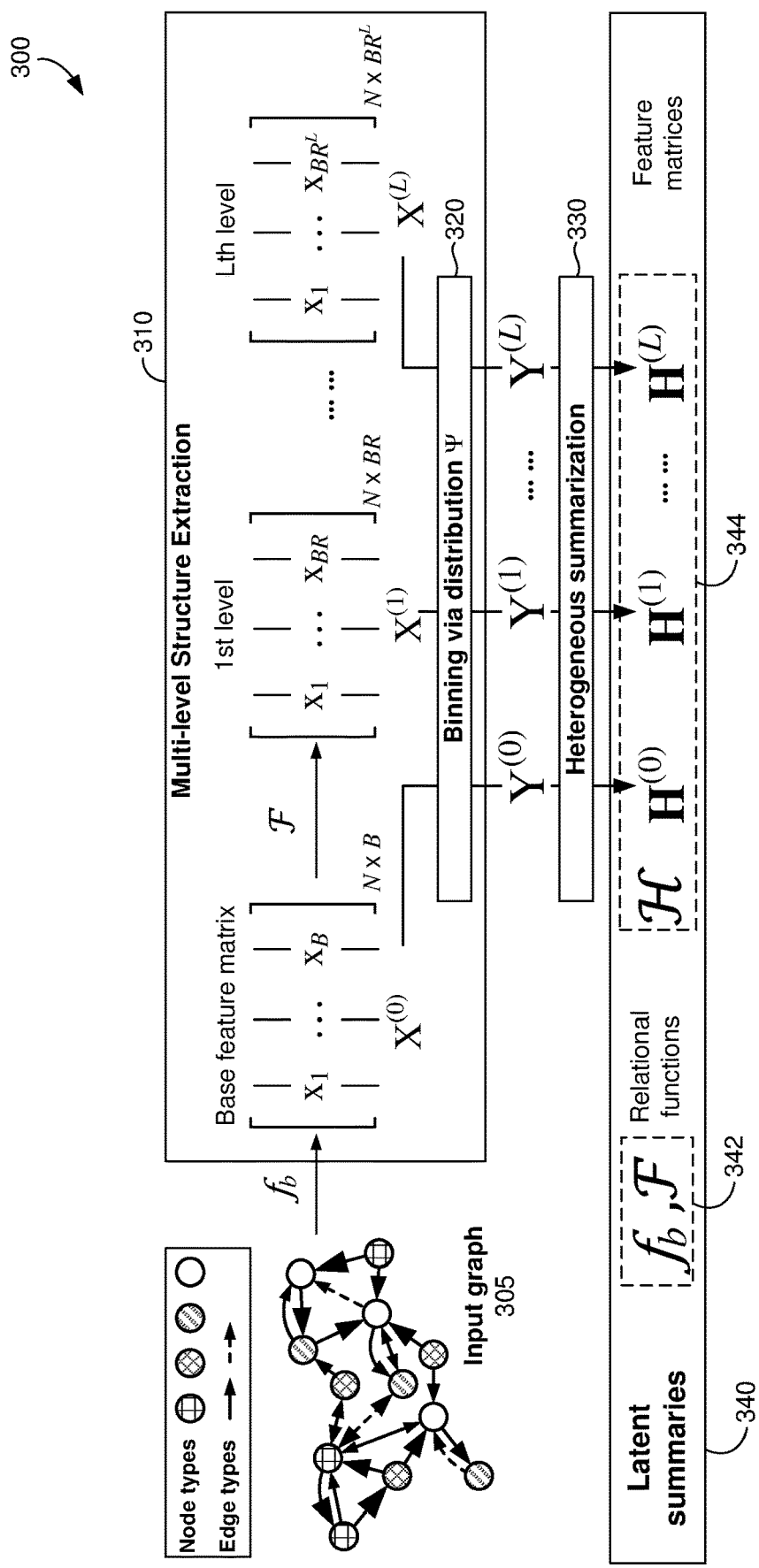
FIG. 3 is a block diagram illustrating an example latent summarization system, in accordance with embodiments of the present invention.

FIG. 3 illustrates an example latent summarization system 300. At a high level, latent summarization system 300 performs multi-level structure extraction 310 and heterogeneous summarization 330 on input graph 305 to generate $\mathscr{H}$ (feature matrices 344). More specifically, latent summarization system 300 applies a designated set of base graph functions $f_b$ to input graph 305 to derive the base feature matrix $X^{(O)}$. Designated relational functions $\mathscr{F}$ can be iteratively applied to the base feature matrix $X^{(O)}$ to derive higher-order feature matrices $X^{(l)}$ that capture proximity information at different distances (node separations) corresponding to different levels l of the base feature matrix $X^{(O)}$. Any type of base function and/or relational function can be designated and may comprise one or more relational operators (e.g., mean, variance, sum, max, min, 11-distance, and/or 12-distance). In some embodiments, a binning function $\Psi$ 320 is applied to describe each feature vector in X (e.g., each N×1 column vector) by the distribution of its feature values. Applying $\Psi(X^{(l)})$ produces distributions denoted as $Y^{(l)}$. Latent summarization system 300 may apply heterogeneous summarization 330 to account for heterogeneity in input graph 305, and a dimensionality reduction technique can be applied (e.g., singular value decomposition (SVD), non-negative matrix factorization, etc.). The result is a set of feature matrices 344 at different levels l ($H^{(O)}$, $H^{(l)}$, ..., $H^{(l)}$) collectively referred to as $\mathscr{H}$. In the embodiment illustrated in FIG. 3, the resultant latent summaries $\mathscr{S}$ 340 include feature matrices $\mathscr{H}$ 344 and the relational functions 342 used to derive them. The size of latent summaries $\mathscr{S} = \mathscr{F}$, $\mathscr{H}$ is independent of the size of input graph 305 (i.e., number of nodes N and edges M). The details of each of these steps is explained in more detail below.

As explained above, the latent summarization system can capture features by applying relational functions to a graph to evaluate structural information and node proximity in node-centric subgraphs at different distances. A relational function $f \in F$ is a composition of relational operators $f = \phi_1 \circ \ldots \circ \phi_{h-1} \circ \phi_h)$ (x,S) applied to feature values in x associated with a set of applicable graph elements S (e.g., nodes in a 1-neighborhood $\Gamma$). A relational operator $\phi(x,S)$ is a basic function (e.g., sum) that operates on a feature vector x (e.g., an N×1 feature vector) associated with the applicable nodes S and returns a single value. Together, relational operators and relational functions can be used to capture structural information of a graph.

Figures 4A, 4B:
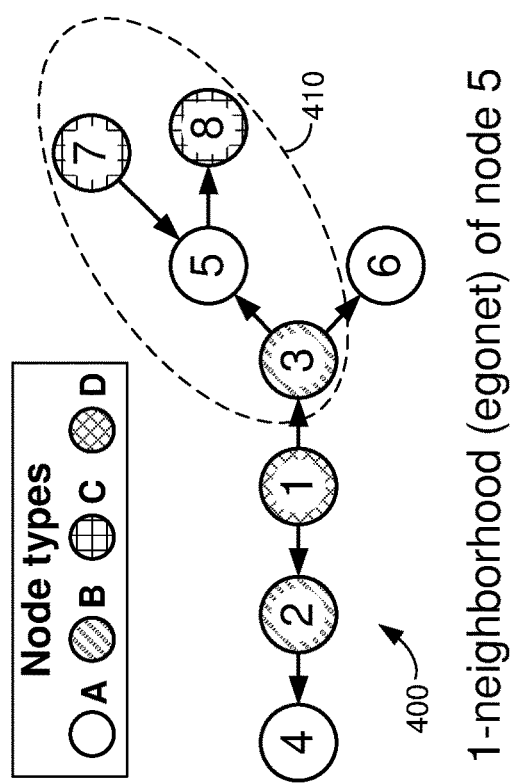
FIGS. 4A and 4B illustrate an example technique for applying an order-1 relational function to an egonet to derive structural information, in accordance with embodiments of the present invention.

FIGS. 4A and 4B illustrate an example technique for applying an order-1 relational function to an egonet F to derive structural information (e.g., graph statistics). More specifically, FIG. 4A depicts unweighted graph 400 and egonet 410, which is the 1-neighborhood (the subset of nodes within a 1-hop distance) of node 5, $\Gamma(5)$. FIG. 4B illustrates adjacency matrix 420 of graph 400, along with vectors $A_{5:}$ and $A_{:5}$, which can be used to derive the structural information. Taking a simple example of a summing relational function that captures simple base features such as in/out/total degree, structural information can be computed for each node of graph 400. For node 5, for example, out-deg(5)=Σ($A_{5,:}$, Γ) and in-deg(5)=Σ($A_{:,5}$, Γ). In this example, the derived structural information is independent of node type. In some embodiments, structural information can account for heterogeneity by changing the applicable set of nodes S. For example in FIG. 4A, rather than operating over the full egonet 410 Γ(5), the applicable set of nodes S can be restricted to neighboring nodes of type B that point to node 5, for example, which can be captured as Σ($A_{:,5}$, $Γ_B^{1-}$), where $Γ_B^{1-}$ denotes the set of nodes with type B that are in the in-neighborhood.

Multi-Level Structure Extraction

To extract subgraph features at different distances (node separations), a set of node-level structural features can be generated using a set of base graph functions $f_b$. Based on $f_b$, new functions can be composed by iteratively applying a set of relational operators to generate feature matrices at different levels l corresponding to the different iterations. The feature matrices can be described by their distribution of values to avoid producing data with an overwhelming size. The resulting distribution-represented features form the collection of matrices at different levels l ($Y^{(0)}$, $Y^{(l)}$, ..., $Y^{(l)}$), collectively referred to as Y.

Base Functions.

As a special relational function, each base graph function $f_b \in \mathcal{F}_b$ can be constituted by one or more relational operators that operate on an initial feature vector $b \in \mathcal{B}$, where b denotes an initial node-specific feature vector. In some embodiments, the feature vector b can correspond to a particular row or column of the adjacency matrix for node i (e.g., vectors $A_{5,:}$ or $A_{:,5}$ of FIG. 4B), or some other derived vector related to the node (e.g., indicating the node's distance or influence with respect to other nodes in a graph). In some embodiments, the latent summarization system can set $f_b$=Σ to capture simple base features such as in/out/total degrees. Additionally or alternatively, any relational function with arbitrary order can be used. The latent summarization system can apply the same base function to the egonets of all nodes in graph G, which can be denoted as follows:

$$f_b \langle b, Γ^1 \rangle = [f_b(b, Γ(1)), f_b(b, Γ(2)), \ldots, f_b(b, Γ(N))]^T,$$
$$b \in \mathcal{B} \quad (1)$$

and which forms an N×1 vector. For example, $f_b$=Σ($A_{v,:}$, Γ) enumerates the out-degree of all nodes in graph G. By applying $f_b$ on each initial feature b in $\mathcal{B}$ for all N nodes, an N×B base matrix $X^{(0)}$ can be obtained:

$$X^{(0)} = [f_b \langle b_1, Γ \rangle, f_b \langle b_2, Γ \rangle, \ldots, f_b \langle b_B, Γ \rangle],$$
$$b_1 \ldots b_B \in \mathcal{B} \quad (2)$$

Base matrix $X^{(0)}$ captures different structural properties of the nodes of a graph within the 1-neighborhood Γ (e.g., egonet 410 of FIG. 4A).

Relational Functions.

To capture high-order structural information at different distances (node separations) in a graph, the latent summarization system can iteratively apply relational operators Φ on the base matrix $X^{(0)}$ (e.g., on the columns of the base matrix $X^{(0)}$). This iterative application derives higher-order feature matrices $X^{(l)}$ that capture structural information at different node separations corresponding to the different levels l. The resultant multi-level structural representation of the graph is indicated as $X^{(l)}$, $X^{(2)}$, ..., $X^{(l)}$, where the j-th column of a given feature matrix $X^{(l)}$ can be represented as:

$$X_{:,j}^{(l)} = \phi \circ \underbrace{(\phi \circ \ldots \circ \phi)}_{l-1 \text{ times}} \langle X_{:,j}^{(0)}, Γ \rangle, \phi \in \Phi \quad (3)$$

Figure 5B:
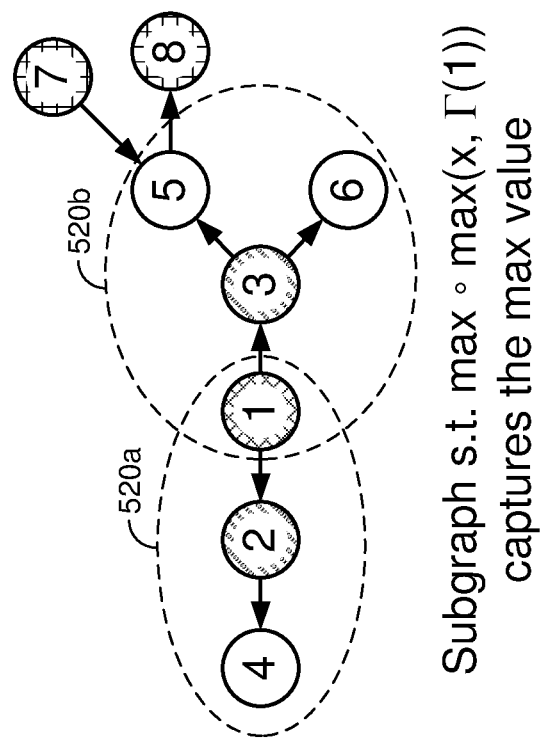
FIGS. 5A and 5B illustrate an example technique for iteratively applying an order-1 relational function to an egonet to derive higher-order structural information, in accordance with embodiments of the present invention.
Figure 5A:
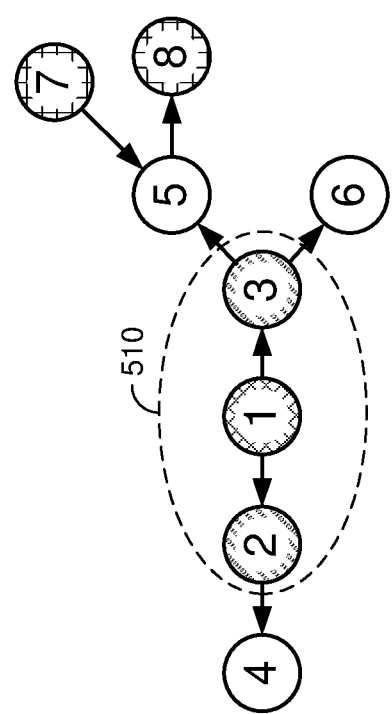

At a given level l, the latent summarization system can apply R operators Φ to the previously obtained $X^{(l-1)}$, such that the dimension of $X^{(l)}$ is N×$BR^l$. Although the dimension grows exponentially with increasing level l, real-world graphs are dense with small diameters, such that a threshold number of compositions (levels) can be set without loss of structural information (e.g., L≤5). For each level l, the corresponding l-order composition of relational functions captures structural information (e.g., graph statistics) associated with the l-order node-centric subgraphs. FIGS. 5A and 5B illustrate example egonets applicable to first (FIG. 5A) and second order (FIG. 5B) relational functions operating on node 1. Taking a max operator as an example, the max operator captures the maximum of a specific feature x in Γ(i) for all nodes i ∈ V. Together these maximums can be used to form a new feature vector max⟨x, Γ⟩. FIG. 5A illustrates subgraph 510 such that max(x, Γ(1)) captures the maximum value of vector x for the nodes in subgraph 510 {1, 2, 3}. The composition of relational functions incorporates node features in expanded subgraphs (contexts). As such, the second order application of the max operator, max ∘ max(x, Γ(1)), returns the maximum value of vector x for nodes in the 2-neighborhood of node 1: {1, 2, 3, 4, 5, 6}. FIG. 5B illustrates this 2-neighborhood as the union of subgraphs 520a and 520b. More specifically, when max is applied again to the resultant vector associated with nodes in Γ(1), the maximum values from Γ(2) and Γ(3) are aggregated and compared, which is equivalent to outputting the maximum in $Γ^2(1)$. Therefore, the latent summarization system can efficiently explore higher-order structural information for node i in its broader neighborhoods by recursively applying relational functions only over its egonet Γ(i), without requiring the exponential complexity of traversing higher-order subgraphs.

The particular order in which relational operators are applied is relevant in Eq. (3): the feature vector $x^{(l)}$ derived from $x^{(0)}$ will be semantically different if the same set of l relational operators are applied in a different order. A set of nonlimiting examples of possible relational operators in Φ are shown in Table 2. For example, relational operators can include mean, variance, sum, max, min, l1-distance, and/or l2-distance, to name a few.

TABLE 2

A few examples of relational operators

| Φ | Definition | Φ | Definition |
| --- | --- | --- | --- |
| max/min | max/min$_{i \in S}$ $x_i$ | variance | $\frac{1}{|S|} \sum_{i \in S} x_i^2 - \left( \frac{1}{|S|} \sum_{i \in S} x_i \right)^2$ |
| sum | $\sum_{i \in S} x_i$ | l1-distance | $\sum_{j \in S} |x_i - x_j|$ |
| mean | $\frac{1}{|S|} \sum_{i \in S} x_i$ | l2-distance | $\sum_{j \in S} (x_i - x_j)^2$ |

Handling Skewed Data.

The l-order composed relational functions in $\mathcal{F}$ gather l-order structural information into the feature matrix $X^{(l)}$. As explained in more detail below, feature matrix $X^{(l)}$ can be summarized into a latent space. However, the specific feature values in $X^{(l)}$ may be computationally demanding, or even overwhelming, due to the power-law nature of real-world graphs (e.g., total degree), leading to under-representation of other features in a summary. To handle potential skewness in data, a given feature vector (e.g., each N×1 feature vector) can be represented by the distribution of its feature values. As such, in some embodiments, binning (e.g., logarithmic binning) can be applied to any or all of the feature matrices. For a given feature vector x, a set of nodes S' and c bins, logarithmic binning can be applied to generate a vector of length c as follows:

$$\Psi(x, S', c) = [C(0), C(1), \ldots, C(\log_\alpha(c))] \quad (4)$$

where $C(z) = \Sigma i \in S' \delta(z, x_i)$, $\delta$ is the Kronecker delta (a.k.a indicator) function, and $\alpha$ is the logarithm base. In some embodiments, c=max{max x, c}. Setting c to be the maximum between the explicitly given value (c) and the maximum feature value (max x) (e.g., independent of node type) can ensure that the output bin counts remain the same across all features. Zeroes can be used to fill in Eq. (4) in the case where c>max x.

Similar to the naming convention used in Eq. (1), $\Psi\langle x, S', c\rangle$ can be used to designate the process of applying a binning function $\Psi$ over all nodes in V (e.g., rows of X) to produce an N×c log-distribution feature matrix. Furthermore, the process of applying a binning function $\Psi$ to all feature vectors (e.g., columns of X) can be designated as $Y = \Psi\langle X, S', c\rangle$ where Y is the resultant distribution-based feature matrix. As explained in more detail below, a binning function $\Psi$ can be applied on different local subsets S'⊆Γ in order to incorporate heterogeneity in a summary.

Summarizing Heterogeneity

In the foregoing discussion, values in the feature matrix X were derived without considering graph heterogeneity (e.g., node types, edge directionality, edge type, etc.). However, for heterogeneous graphs, heterogeneity can impact graph structural information. For example, in a directed email exchange network, spammers with high out-degrees but trivial in-degrees could be incorrectly identified as important clients if edge directionality is not captured. Therefore, in some embodiments, a compressed representation can be generated that captures sufficient complexity to handle an arbitrary input network G (P1) by summarizing individual node behaviors with respect to any or all of node types, edge directionality, edges types, and any other parameter of interest. As such, the latent summarization system can address heterogeneity by representing nodes of a graph (e.g., each individual node i) based on the distributions of feature values in X associated with different contexts S such as neighbors with the same type, neighbors pointed by i, and the like.

Node Type.

In heterogeneous graphs, the interaction patterns between a node and its neighbors of a specific type reveal behavioral information. Nodes that have similar interaction patterns with neighboring nodes are often themselves similar. For example, in author-paper-venue networks, authors submitting papers to the same track at the same conference have higher similarity with one another than with authors submitting to different tracks at the same conference. To describe how a specific node i interacts with nodes of type t, the latent summarization system can evaluate neighbors of type t by setting $S' = \Gamma_t(i)$ and computing a localized distribution of a particular feature vector x as $\Psi\langle x, \Gamma_t(i), c\rangle$. Repeating this process for nodes i ∈ V forms an N×c distribution matrix $\Psi\langle x, \Gamma_t(i), c\rangle$.

Figure 6:
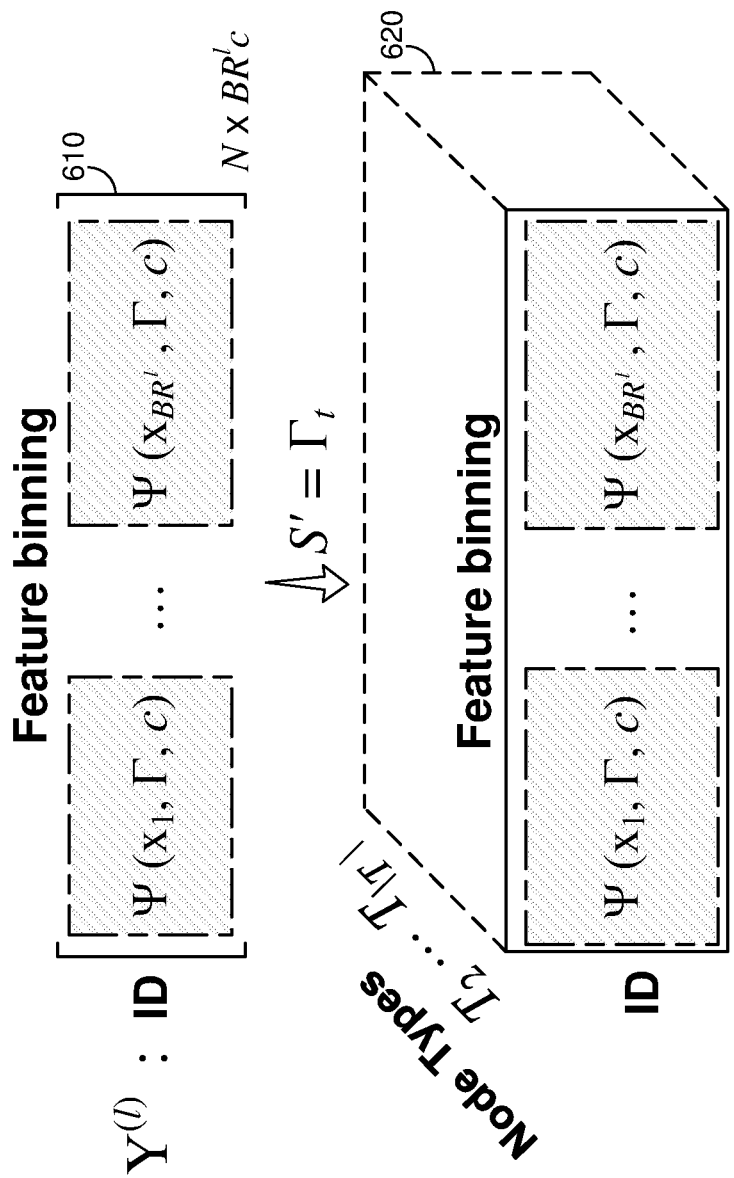
FIG. 6 illustrates an example of feature binning, in accordance with embodiments of the present invention.

The latent summarization system can enumerate all types of neighbors within Γ to incorporate complete interaction patterns for each node in a graph. This process can be seen as introducing one more dimension (the node types) to Y to form a tensor, as shown in FIG. 6. FIG. 6 illustrates an example of feature binning applied at a particular level l. More specifically, $Y^{(l)}$ captures the distributions of feature values for feature vectors in X. The distribution of feature vector x for nodes i ∈ V is represented as an N×c distribution matrix $\Psi\langle x, \Gamma_t(i), c\rangle$. Each such distribution is illustrated in FIG. 6 with a patterned background. Repeating for each feature vector in B at any given level l, results in $BR^l$ distribution matrices. These distribution matrices can be horizontally concatenated, for example, to form an $N \times BR^l c$ distribution matrix at level l (e.g., distribution matrix 610 of FIG. 6). To account for different node types, localized distribution matrixes can be computed for each node type t ∈ $T_V$ and added as a dimension to distribution matrix 610 to form tensor 620. Tensor 620 can be flattened with horizontal concatenation, for example, to produce a feature matrix (e.g., distribution matrix $Y_{ot}$) that accounts for node type:

$$Y_{ot} = [\Psi\langle X, \Gamma_{T_1}, c\rangle, \Psi\langle X, \Gamma_{T_2}, c\rangle, \ldots, \Psi\langle X, \Gamma_{T_{|T_V|}}, c\rangle] \quad (5)$$

Edge Directionality.

When an input graph is undirected, the context S' can be set to S'=Γ to search for neighbors in the 1-hop neighborhood, regardless of edge direction. In some embodiments, the latent summarization system can summarize directed input graphs by differentiating nodes in an out-neighborhood from nodes in an in-neighborhood. The process is similar to the undirected case, but instead of setting S'=Γ, two disjoint subsets $\Gamma^+$ and $\Gamma^-$ with incoming and outgoing edges, respectively, can be summarized. The resultant feature matrices (e.g., distribution-based feature matrices) can be denoted as $Y_{ot}^+$ and $Y_{ot}^-$, respectively. Again, the (distribution-based) feature matrices can be concatenated (e.g., horizontally) to produce a feature matrix (e.g., distribution matrix $Y_{ot}$) that accounts for node type and edge directionality: $Y_{ed} = [Y_{ot}^+, Y_{ot}^-]$.

Edge Types.

Additionally or alternatively, edge types in heterogeneous graphs can play an important role in graph semantics and structure. The same connection between a pair of nodes with different edge types could convey entirely different meanings (e.g., an edge could indicate "retweet" or "reply" in a Twitter-communication network). To handle this graph model, the latent summarization system can construct subgraphs $g(V, E_t)$ restricted to a specific edge type t ∈ $T_E$. For each subgraph, the latent summarization system can repeat the process to obtain a corresponding feature matrix $Y_{ed}$ per edge type that incorporates both node types and edge directionality. Again, the (distribution-based) feature matrices can be concatenated (e.g., horizontally) to obtain a representation that accounts for node type, edge directionality, and edge type, which can be denoted as:

$$Y_{et} = [Y_{ed1}, Y_{ed2}, \ldots, Y_{ed|T_E|}] \quad (6)$$

Therefore, $Y_{et}$ may be of size $N \times q^{(l)}$ where $q^{(l)} = 2|T_V| \cdot |T_E| \cdot c \cdot BR^l$.

Although the foregoing discussion involves summarizations that account for node type, edge directionality, and edge type, any variation of these and other properties may be applied. For example, in some embodiments, node types and edge directionality may be used by default to construct Y, and edge types may be considered only when the input is a multi-layer graph model or explicitly indicated. These and other variations are contemplated within the present disclosure.

Latent Summarization

One of the primary challenges with summarization is that the information loss incurred by compression forecloses the ability to subsequently derive a node embedding (a behavioral representation on a node-wise basis). For example, techniques that leverage the skip-gram model to derive node embeddings can be understood as an implicit low-rank factorization of a particular node-context matrix M such that $M=UH^T$, where U is the node-rank factor and $H^T$ is the rank-context factor. The rank-context factor $H^T$ can be thought of as a summary, such that the node-rank factor U can be derived as the node embeddings. However, this technique requires storing M in the first place, which violates (P2), and cannot handle transfer learning tasks (P3).

Instead, the latent summarization system can use feature matrix $Y_{et}^{(l)}$ as the node-context matrix M to capture heterogeneity at level l. Further, the latent summarization system can perform dimensionality reduction on $Y_{et}^{(l)}$ (e.g., singular value decomposition (SVD), non-negative matrix factorization, etc.) to generate feature matrix $H^{(l)}$, a low-rank compressed graph representation. For example, in embodiments which use SVD, a compressed feature matrix $H^{(l)}$ can be given as:

$$H^{(l)} = \sqrt{\Sigma_r^{(l)}} V_r^{(l)T} \qquad (7)$$

where $\sqrt{\Sigma_r^{(l)}}$ and $V_r^{(l)T}$ are the square root of the singular values of $Y_{et}^{(l)}$ and its right singular vectors, respectively. The latent summarization system can generate $H^{(l)}$ and store it into $\mathcal{H}$ as a part of the latent summary. There is no need to store the dense node embedding matrix $U^{(l)}$, since it can be derived directly from $Y_{et}^{(l)}$ and the stored $H^{(l)}$. Further, $Y_{et}^{(l)}$ does not need to be stored since it can be derived on-the-fly using the relational function compositions in $\mathcal{F}$. In practice, both terms $Y_{et}^{(l)}$ and $U^{(l)}$ can be derived efficiently using SVD because $Y_{et}^{(l)}$ is sparse and $H^{(l)}$ is of low-rank. Similarly, any intermediate matrices used in such a derivation do not need to be stored, as they can be estimated directly using $\mathcal{F}$ and $\mathcal{H}$.

Therefore, in some embodiments, the latent summarization system can output a summary $\mathcal{S}$ that can consist of two elements: (1) a set of relational functions $\mathcal{F}$, which can be used to capture node-wise structural information that applies to arbitrary networks and (2) a set of feature matrices (e.g., low-rank factorized feature matrices, $\mathcal{H}$) which capture significant structural features in subgraphs at different distances (node separations) in a latent space. Since functions in $\mathcal{F}$ and compressed matrices in $\mathcal{H}$ are independent of the number of nodes or edges of the input graph, both require trivial storage and achieve space efficiency (P2). Furthermore, unlike existing node embedding methods, a node-wise representation matrix $U \in \mathbb{R}^{N \times K}$ (which requires significant storage space and depends on graph size), need not be stored. As explained in more detail below, elements in $\mathcal{F}$ and $\mathcal{H}$ can operate together to handle inductive learning tasks (P3) and the derivation of specific node embeddings (P4). Finally, the latent summarization system is easy to parallelize as the relational functions can be applied to subgraphs of each node independently, and feature values can be computed locally (e.g., on separate processors).

Inductive Summaries (P3).

In some embodiments, the latent summarization system can use a latent summary of one graph to derive an inductive summary of another graph (e.g., by inductive summarization component 245 of FIG. 2). Given a set of relational functions $\mathcal{F}$, the latent summarization system can automatically compose new relational functions to capture structural features that are transferable from one graph to another. More specifically, feature matrices $\mathcal{H}$ learned on G can be transferred to another graph G' for inductive learning tasks. For example, suppose factorized feature matrices $\mathcal{H}$ are learned from G using $\mathcal{F}$. Equation (8) illustrates a process of inductively learning node embeddings for a new, previously unseen graph G' using $\mathcal{H}$.

$$U'^{(l)} = Y'^{(l)}(H^{(l)})^\dagger \qquad (8)$$

In equation (8) above, $H^{(l)} \in \mathcal{H}$ is a multi-level factorized latent summary learned on G, $(H^{(l)})^\dagger$ denotes the pseudo-inverse of $H^{(l)}$, and $Y'^{(l)}$ can be obtained by applying $\mathcal{F}$ to G'. The pseudo-inverse $(H^{(l)})^\dagger$ can be efficiently computed using SVD, for example, as long as the rank of $H^{(l)}$ is limited (e.g., empirically setting $K_l \leq 128$).

To apply Eq. (8), the dimensions of $H^{(l)}$ can be made consistent with the new graph G' by setting $r^{(l)} = r'^{(l)}$ and $c = c'$ at each level l. In essence, this is equivalent to setting the dimensions of $H^{(l)}$ to be identical to $H'^{(l)}$, which is the output that can be generated by applying the latent summarization system on G'. By setting $r^{(l)} = r'^{(l)}$, the latent summarization system captures the same number of major structural features at each level of the relational compositions, and by setting $c = c'$, the numbers of bins in the distribution-based feature matrices are set identical at all levels. Both criteria can be satisfied by recording the order of ranks at each level, and manually setting c large enough (e.g., maximum of all feature values), since all-0 columns can be filtered out automatically. The node-embeddings learned in this inductive scheme capture node-wise structural differences between graphs, which can be applied to domain-specific graph mining and time-evolving analysis, among other applications. Examples of temporal anomaly detection are described in more detail below.

On-the-Fly Node Embedding Derivation (P4).

In some embodiments, the latent summarization system can use a latent summary to derive node embeddings on-the-fly (e.g., by node embedding component 250 of FIG. 2). Generally, the latent summarization system can use relational functions $\mathcal{F}$ to derive feature matrices $Y^{(l)}$ at different levels. A node-embedding matrix at each level $U^{(l)}$ can be derived using SVD such that $U^{(l)} = U_r^{(l)} \sqrt{\Sigma_r^{(l)}}$. Although embodiments are described using SVD, any other low-rank matrix factorization technique can be used to derive a low-dimensional embedding. The $U^{(l)}$ given at the output at each level can be concatenated to form a final node embedding. The dimension of node-embeddings is determined by the rank r at level l. In some embodiments, r can be set as $r = K_l$ so $\Sigma_{l=1}^L K_l = K$ determines the dimensionality of the final node embedding.

Generally, the latent summarization system evaluates node structural similarity based on an assumption that similar nodes should have similar structural behaviors in node-centric subgraphs at different distances (node separations). As explained above, matrix $X^{(l)}$ can capture structural information associated with the 1-order node-centric subgraphs of G, and Y can be used as a distribution-based representation that accounts for heterogeneity. By applying Eq. (7) to each $Y^{(l)}$, these subgraphs can be evaluated separately and coherently to generate a hierarchical, multi-level latent summary of G. Generally, higher-order feature matrices provide more "global" structural information at the cost of higher complexity, while low-order feature matrices focus on more "local" information with lower complexity.

As a result, a derived embedding matrix $U_i$ can also preserve node similarity at multiple levels.

As such, various techniques may be applied to generate a latent summary of a graph. Latent summarization can involve applications of feature capture, binning, heterogeneity summarization, and/or dimensionality reduction to generate a latent summary of a graph G. An example algorithm for latent summarization is provided in Algorithm 1.

---

Algorithm 1: Latent Summarization

---

Require:
(un)directed heterogeneous graph G,
a set of relational operators $\Phi = \{\phi_1, \ldots, \phi_R\}$,
Layer-wise embedding dimension constants $K_l$, $\Sigma_{l=1}^{L} K_l = K$
a constant c indicating number of bins 1:   $\mathscr{F} \leftarrow f_b$       ▷ Base graph functions: Eq. (1)
2:   Initialize $X^{(0)}$       ▷ Eq. (2)
3:   for l = 1, . . . , L do       ▷ layers in the multi-level summarization
4:     Initialize $X^{(l)}$
5:     for r = 1, . . . , R do       ▷ relational operators $\{\phi_1, \ldots, \phi_R\}$
6:       parallel for j = 1, . . . , $BR^l$ do       ▷ Columns in $X^{(l)}$
7:         $X^{(l)} = X^{(l)} \cup \phi_r \langle X_{:,j}^{(l-1)}, \Gamma \rangle$       ▷ Feature concatenation
8:       Solve Eq. (6) to derive $Y_{et}^{(l)}$       ▷ Capture heterogeneity
9:       Solve Eq. (7) by factorizing $Y_{et}^{(l)}$ to obtain $H^{(l)}$
10:     Add the relational function compositions to $\mathscr{F}$
11:   $\mathscr{H} \leftarrow \mathscr{H} \cup H^{(l)}$
12:   return summarization $\mathscr{S} = \{\mathscr{F}, \mathscr{H}\}$

---

In some embodiments, the latent summarization system can summarize any type of graph, including labeled and attributed graphs. As explained above, the latent summarization system can summarize heterogeneous graphs. Generally, homogeneous, bipartite, signed, and labeled graphs are all special cases of heterogeneous graphs with $|T_V|=|T_E|=1$ types, $|T_V|=2$ and $|T_E|=1$ types, $|T_V|=1$ and $|T_E|=2$ types, and $\{1, \ldots, k\}$ node (or edge) types, respectively. Other special cases include k-partite and attributed graphs. Additionally or alternatively, the latent summarization system can summarize attributed graphs that have multiple attributes per node or edge (instead of a single label). For example, an initial set of attributes organized in an attribute matrix $X^{(b)}$ can be concatenated with the base attribute matrix and the result summarized as explained above. In another example, the graph can be transformed into a labeled graph by applying a labeling function $\xi: x \rightarrow y$ that maps every node's attribute vector x to a label y. These and other variations will be understood by those of ordinary skill in the art.

Graph-Based Tasks

A latent summary can be used to perform any type of graph-based task such as node classification, node clustering, link prediction, entity resolution, anomaly and event detection, and others. For example, in some embodiments, a latent summary can be used to perform link prediction (e.g., by link prediction component 255 of FIG. 2). In order to predict links (edges) between nodes, any predictive algorithm can be applied, such as logistic regression (e.g., with default settings such as regularization strength=1.0, stopping criteria=10-4, etc.). Generally, training, test, and ground truth data sets can be generated. An edge $e_{i,j}$ can be represented by concatenating node-embeddings of its source and destination nodes: $emb(e_{i,j})=[emb(i), emb(j)]$. The latent summarization system can learn node embeddings for each dataset G(V, E) by creating a subgraph G'(V, E') that includes all nodes of G, but randomly excludes some subset of edges (e.g., 40%). Node embeddings can be derived from G' (e.g., based on its latent summary) and some subset of edges (e.g., 10%|E|) can be randomly selected for training data. Out of the removed edges, some subset (e.g., 25% (10%|E|)) can be used as missing links for testing. Fake edges can be randomly created for the training and testing datasets. As such, the predictive algorithm can be trained to predict missing links (e.g., recommendations) or incorrect links.

In some embodiments, a latent summary can be used to perform inductive anomaly detection (e.g., by inductive anomaly detector 160 of FIG. 1), such as anomalous subgraph detection and real-world graph event detection. For example, anomalous subgraph detection can be performed on real-world graphs by constructing two graphs $G_1$ and $G_2$ (e.g., using two consecutive daily datasets). The latent summarization system can learn a latent summary $\mathscr{S}$ from $G_1$, inductively learn node embeddings of $G_2$, and compute their node-wise Euclidean distances (or some other distance metric such as cosine similarity). Any suitable measure of deviation may used to identify deviating nodes (e.g., standard deviation, top-n deviating nodes, etc.).

In another example, the latent summarization system can perform event detection on real-world graphs. Generally, the goal of such event detection may be to detect important events occurring over time that may appear unusual or anomalous with respect to the global behavior of the underlying graph. Two real-world examples are described below with respect to datasets relating to Twitter (available at http://odds.cs.stonybrook.edu/twittersecurity-dataset/) and Enron (available at http://odds.cs.stonybrook.edu/enroninc-dataset).

Figure 7B:
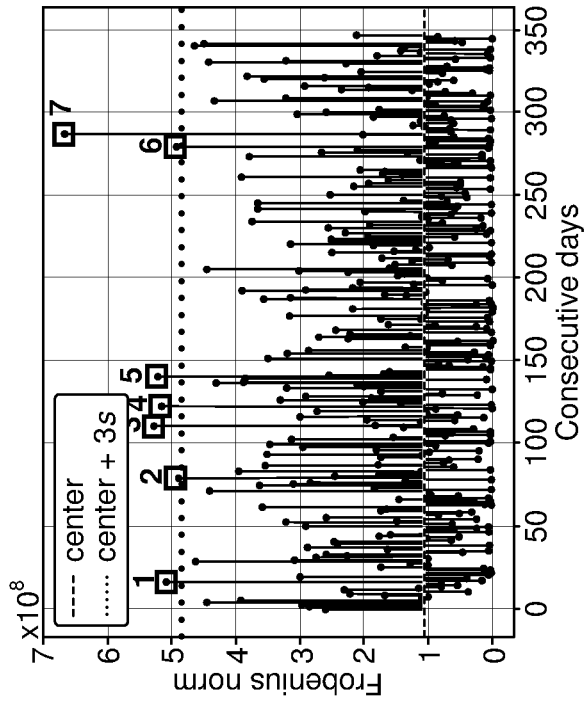
FIGS. 7A and 7B illustrate example use cases of anomaly detection using latent summaries, in accordance with embodiments of the present invention.
Figure 7A:
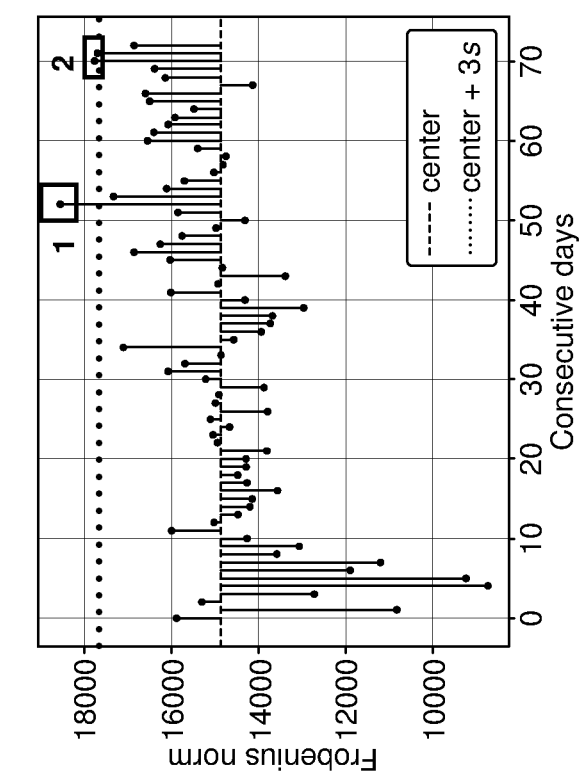

In the Twitter dataset, tweet samples were collected from May 12, 2014 to Jul. 31, 2014 and filtered based on keywords relating to terrorism or domestic security. Daily graphs were generated with nodes representing entities such as keywords or hashtags appearing in Twitter, and edges denoting their coexistence (co-mentions) on a particular day. As with anomalous subgraph detection, event detection can be performed by constructing consecutive (e.g., daily) graphs $G_{t-1}$ and $G_t$, learning a latent summary $\mathscr{S}$ from $G_{t-1}$, and inductively learning node embeddings for $G_t$ using the latent summary $\mathscr{S}$. Node embeddings for consecutive graphs (e.g., days) can be compared to identify abrupt changes of graph structures. For example, the Frobenius norm can be computed for each graph, and any measure of deviation may be used to identify deviating graphs (e.g., standard deviation, top-n deviating graphs, etc.). FIG. 7A illustrates the Frobenius norm for node embeddings of these Twitter co-mentions. The graphs marked 1 and 2 have Frobenius norms that are 3σ units away from the median value for all data, indicating significant distances between node embeddings of consecutive daily graphs (abrupt changes of graph structures), which can be seen as a sign of significant or anomalous events. These events marked 1 and 2 in FIG. 7A correspond to (1) the Gaza-Israel conflict and (2) the Ebola Virus Outbreak. Compared with other events in the same time period, the detected events can be considered the most impactful in terms of the number of people impacted and the attention they drew.

In the Enron dataset, Enron email data from Jan. 1, 2001 to May 1, 2002 was used to construct daily graphs (excluding weekends) with nodes representing email addresses and directed edges representing sent/received relations on a particular day. Using the technique described above, the latent summarization system can detect several events that are notable in the company's history. The detected events illustrated in FIG. 7B include (1) the quarterly conference call where Jeffrey Skilling, Enron's CEO, reports "outstanding" status of the company; (2) the infamous quarterly conference call; (3) FERC institutes price caps across the western United States; (4) the California energy crisis ends; (5) Skilling announces desire to resign to Kenneth Lay, founder of Enron; (6) Baxter, former Enron vice chairman, commits suicide, and (7) Enron executives Andrew Fastow and Michael Kopper invoke the Fifth Amendment before Congress.

These are just a few examples of ways in which latent summaries can be used to perform graph-based tasks. Compared to conventional node embedding techniques, the latent summaries generated by the techniques described herein require significantly less storage, while achieving improvements in the accuracy of graph-based tasks such as link prediction, as well as scalability and space efficiency.

Exemplary Flow Diagrams

Figure 8:
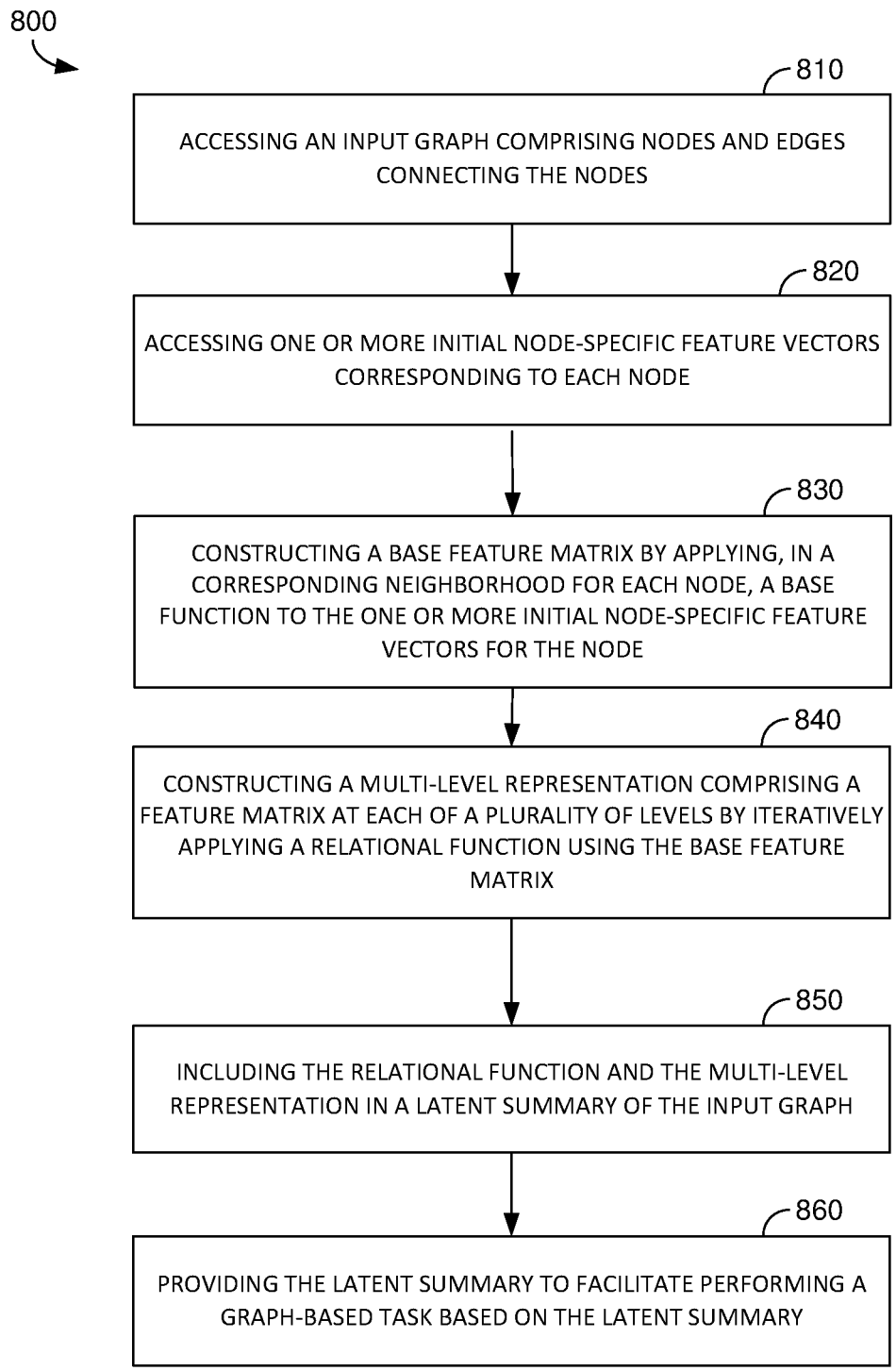
FIG. 8 is a flow diagram showing a method for generating a multi-level representation of a graph, in accordance with embodiments of the present invention.
Figure 9:
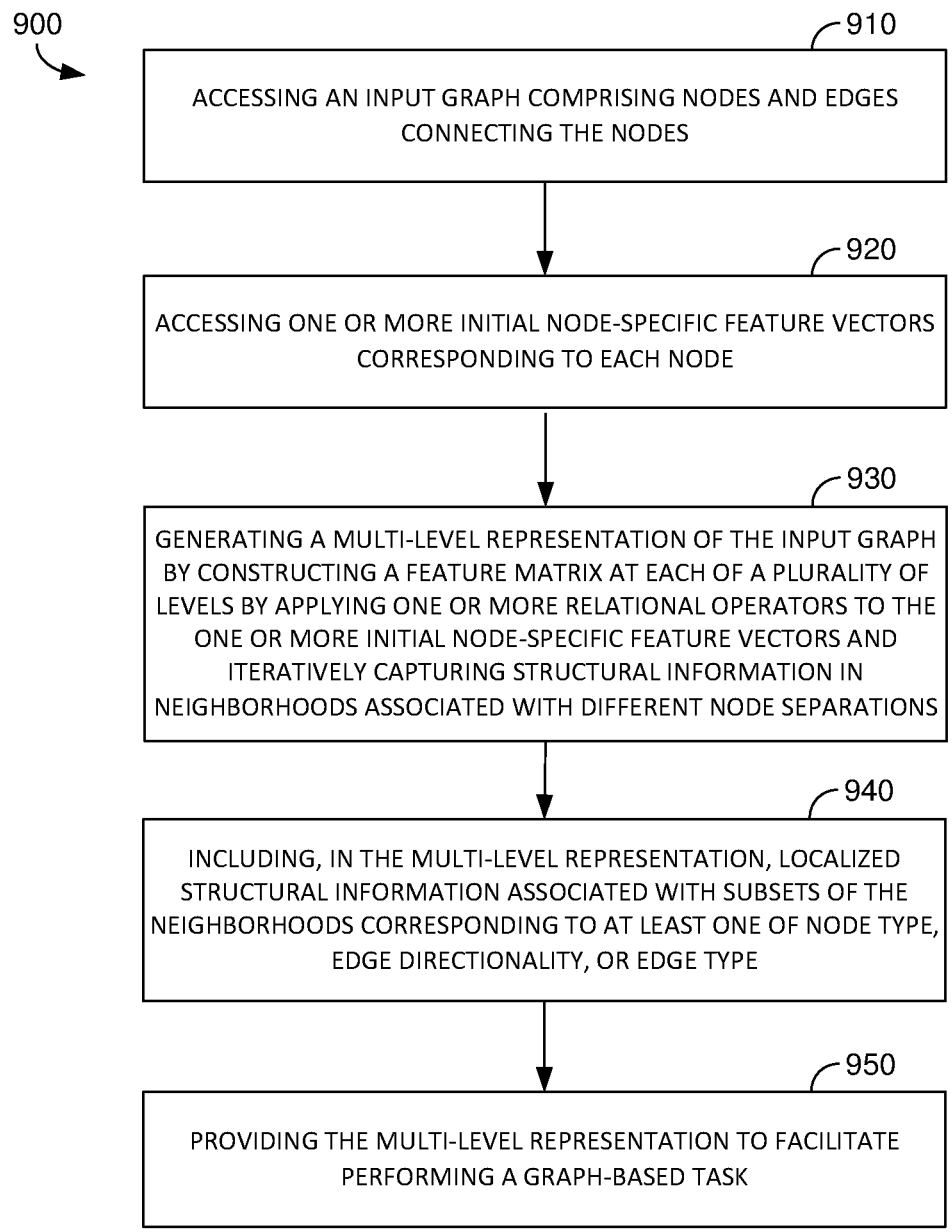
FIG. 9 is a flow diagram showing another method for generating a multi-level representation of a graph, in accordance with embodiments of the present invention.

With reference now to FIGS. 8-9, flow diagrams are provided illustrating methods for generating a multi-level representation of a graph. Each block of the methods 800 and 900 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 8, FIG. 8 illustrates a method 800 for generating a multi-level representation of a graph, in accordance with embodiments described herein. Initially at block 810, an input graph is accessed comprising nodes and edges connecting the nodes. At block 820, one or more initial node-specific feature vectors corresponding to each node are accessed. In some embodiments, the one or more initial node-specific feature vectors can be received with the input graph, and both can be accessed. In some embodiments, the one or more initial node-specific feature vectors can be computed. At block 830, a base feature matrix is constructed by applying, in a corresponding neighborhood for each node, a base function to the one or more initial node-specific feature vectors for the node. At block 840, a multi-level representation is constructed comprising a feature matrix at each of a plurality of levels by iteratively applying one or more relational operators using the base feature matrix. At block 850, the base feature matrix and the multi-level representation are included in a latent summary of the input graph. At block 860, the latent summary is provided to facilitate performing a graph-based task based on the latent summary.

Turning now to FIG. 9, FIG. 9 illustrates a method 900 for generating a multi-level representation of a graph, in accordance with embodiments described herein. Initially at block 910, an input graph is accessed comprising nodes and edges connecting the nodes. At block 920, one or more initial node-specific feature vectors corresponding to each node is accessed. At block 930, a multi-level representation of the input graph is generated by constructing a feature matrix at each of a plurality of levels. The feature matrices are generated by applying one or more relational operators to the one or more initial node-specific feature vectors, and iteratively capturing structural information in neighborhoods associated with different node separations. At block 940, localized structural information associated with subsets of the neighborhoods corresponding to at least one of node type, edge directionality, or edge type is included in the multi-level representation. At block 950, the multi-level representation is provided to facilitate performing a graph-based task.

Exemplary Operating Environment

Figure 10:
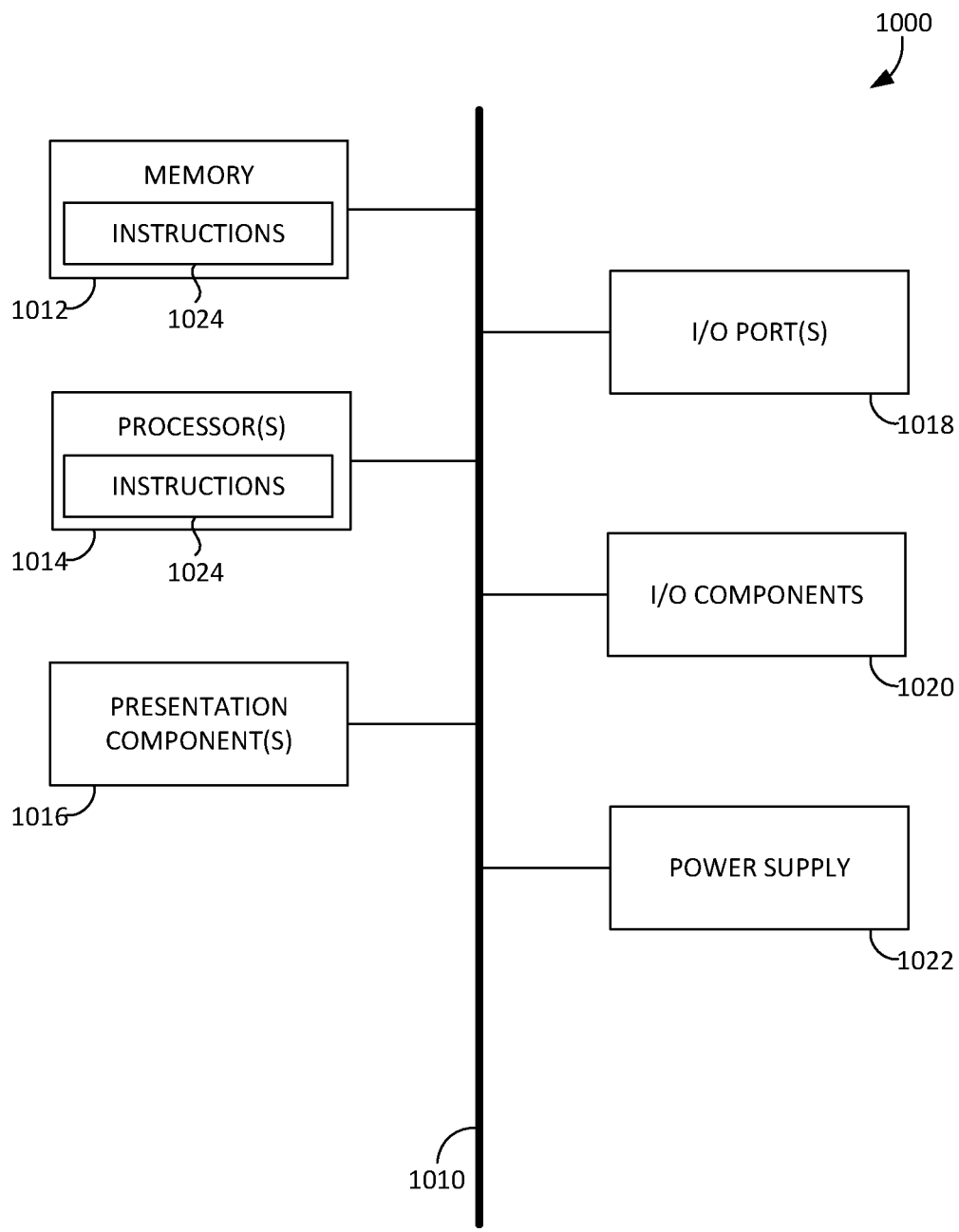
FIG. 10 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output (I/O) ports 1018, input/output components 1020, and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1000.

Computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of computing device 1000 to render immersive augmented reality or virtual reality.

Embodiments described herein support latent summarization of graphs. The components described herein refer to integrated components of a latent summarization system. The integrated components refer to the hardware architecture and software framework that support functionality using the latent summarization system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   accessing an input graph comprising nodes and edges connecting the nodes;
   accessing one or more initial node-specific feature vectors corresponding to each node;
   generating a latent summary of the input graph by:
      constructing a base feature matrix by applying, in a corresponding neighborhood for each node, a base function to the one or more initial node-specific feature vectors for the node; and
      constructing a multi-level representation comprising a feature matrix at each of a plurality of levels by iteratively applying a relational function based on the base feature matrix, wherein the latent summary includes the relational function and the multi-level representation; and
   providing the latent summary to facilitate performing a graph-based task based on the latent summary.

2. The one or more computer storage media of claim 1, wherein the input graph is a heterogeneous graph, and wherein generating the latent summary of the input graph further comprises including, in the multi-level representation, localized structural information associated with one or more subsets of the corresponding neighborhood for each node corresponding to at least one of node type, edge directionality, or edge type.

3. The one or more computer storage media of claim 2, wherein including the localized structural information in the multi-level representation comprises at least one of forming a tensor or concatenating the localized structural information in the multi-level representation.

4. The one or more computer storage media of claim 1, wherein the base function comprises one or more of a mean, variance, sum, max, min, l1-distance, or l2-distance.

5. The one or more computer storage media of claim 1, the operations further comprising applying a binning function to represent each feature vector in the multi-level representation based on distribution of feature values.

6. The one or more computer storage media of claim 1, the operations further comprising applying dimensionality reduction to the multi-level representation.

7. The one or more computer storage media of claim 1, wherein the corresponding neighborhood for each node comprises an egonet of the node.

8. The one or more computer storage media of claim 1, the operations further comprising composing the relational function by iteratively applying one or more relational operators.

9. The one or more computer storage media of claim 1, wherein the graph-based task comprises performing, based on the latent summary, at least one of inductive summarization, node embedding, link prediction, or inductive anomaly detection.

10. A computerized method comprising:
    accessing an input graph comprising nodes and edges connecting the nodes;
    accessing one or more initial node-specific feature vectors corresponding to each node;
    generating a multi-level representation of the input graph by:
       constructing a feature matrix at each of a plurality of levels by applying one or more relational operators to the one or more initial node-specific feature vectors and iteratively capturing structural information in neighborhoods associated with different node separations; and
       including, in the multi-level representation, localized structural information associated with subsets of the neighborhoods corresponding to at least one of node type, edge directionality, or edge type; and
    providing the multi-level representation to facilitate performing a graph-based task.

11. The computerized method of claim 10, wherein including the localized structural information in the multi-level representation comprises at least one of forming a tensor or concatenating the localized structural information in the multi-level representation.

12. The computerized method of claim 10, wherein the multi-level representation further comprises a base feature matrix constructed by applying a base function to the one or more initial node-specific feature vectors for each node.

13. The computerized method of claim 12, wherein the base function comprises one or more of a mean, variance, sum, max, min, l1-distance, or l2-distance.

14. The computerized method of claim 10, the method further comprising applying a binning function to represent each feature vector in the multi-level representation based on distribution of feature values.

15. The computerized method of claim 10, the method further comprising applying dimensionality reduction to the multi-level representation.

16. The computerized method of claim 10, wherein iteratively capturing the structural information in the neighborhoods associated with the different node separations comprises applying the one or more relational operators only over egonets.

17. The computerized method of claim 10, wherein iteratively applying one or more relational operators composes a plurality of relational functions, the method further comprising providing the relational functions to facilitate performing the graph-based task.

18. The computerized method of claim 10, wherein the graph-based task comprises performing, based on the multi-level representation, at least one of inductive summarization, node embedding, link prediction, or inductive anomaly detection.

19. A computer system comprising:
    one or more hardware processors and memory configured to provide computer program instructions to the one or more hardware processors;

a latent summarization component configured to use the one or more hardware processors to:
  access an input graph comprising nodes and edges connecting the nodes;
  access one or more initial node-specific feature vectors corresponding to each node;
  generate a multi-level representation of the input graph by:
    constructing a feature matrix at each of a plurality of levels by applying one or more relational operators to the one or more initial node-specific feature vectors and iteratively capturing structural information in neighborhoods associated with different node separations; and
    including, in the multi-level representation, localized structural information associated with subsets of the neighborhoods corresponding to at least one of node type, edge directionality, or edge type; and
  provide the multi-level representation to facilitate performing a graph-based task.

20. The computer system of claim 19, wherein the graph-based task comprises at least one of inductive summarization, node embedding, link prediction, or inductive anomaly detection.

* * * * *

UNITED STATES PATENT AND TRADEMARK OFFICE
CERTIFICATE OF CORRECTION

PATENT NO. : 11,113,293 B2  
APPLICATION NO. : 16/252169  
DATED : September 7, 2021  
INVENTOR(S) : Di Jin et al.

Page 1 of 1

It is certified that error appears in the above-identified patent and that said Letters Patent is hereby corrected as shown below:

In the Claims

In Column 23, Line 57, Claim 4, delete "l1-distance," and insert -- l1-distance, --, therefor.

In Column 23, Line 57, Claim 4, delete "l2-distance." and insert -- l2-distance. --, therefor.

In Column 24, Line 41, Claim 13, delete "l1-distance," and insert -- l1-distance, --, therefor.

In Column 24, Line 41, Claim 13, delete "l2-distance." and insert -- l2-distance. --, therefor.

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*